United States Patent

Whall

[15] 3,650,188
[45] Mar. 21, 1972

[54] DETACHABLE FILM CHAMBER FOR PHOTOGRAPHIC APPARATUS

[72] Inventor: James M. Whall, Lexington, Mass.

[73] Assignee: Polaroid Corporation, Cambridge, Mass.

[22] Filed: June 26, 1970

[21] Appl. No.: 50,240

Related U.S. Application Data

[63] Continuation-in-part of Ser. No. 803,629, Mar. 3, 1969, abandoned.

[52] U.S. Cl. ..................................................95/11 R, 95/13
[51] Int. Cl. ...............................G03b 19/10, G03b 17/52
[58] Field of Search.................................................95/11, 13

[56] References Cited

UNITED STATES PATENTS 2,467,320  4/1949  Land..........................................95/13

Primary Examiner—John M. Horan
Assistant Examiner—Kenneth C. Hutchison
Attorney—Brown and Mikulka and Alfred E. Corrigan

[57] ABSTRACT

A camera of the self-developing type including an enclosure or chamber coupled to the camera for movement between a compact, inoperative position wherein at least a portion of the chamber is located against a wall of the camera and an extended, operative position in which it forms an extension of the camera and is adapted to receive an exposed film unit as it exits from the camera. The camera includes a pair of rolls for advancing an exposed film unit into the chamber. A switch is located between a source of power and the rolls and is adapted to be closed by movement of the chamber into the extended, operative position thereby insuring that the chamber is in position to receive the exposed film unit prior to the exposed film unit being moved out of the camera.

17 Claims, 8 Drawing Figures

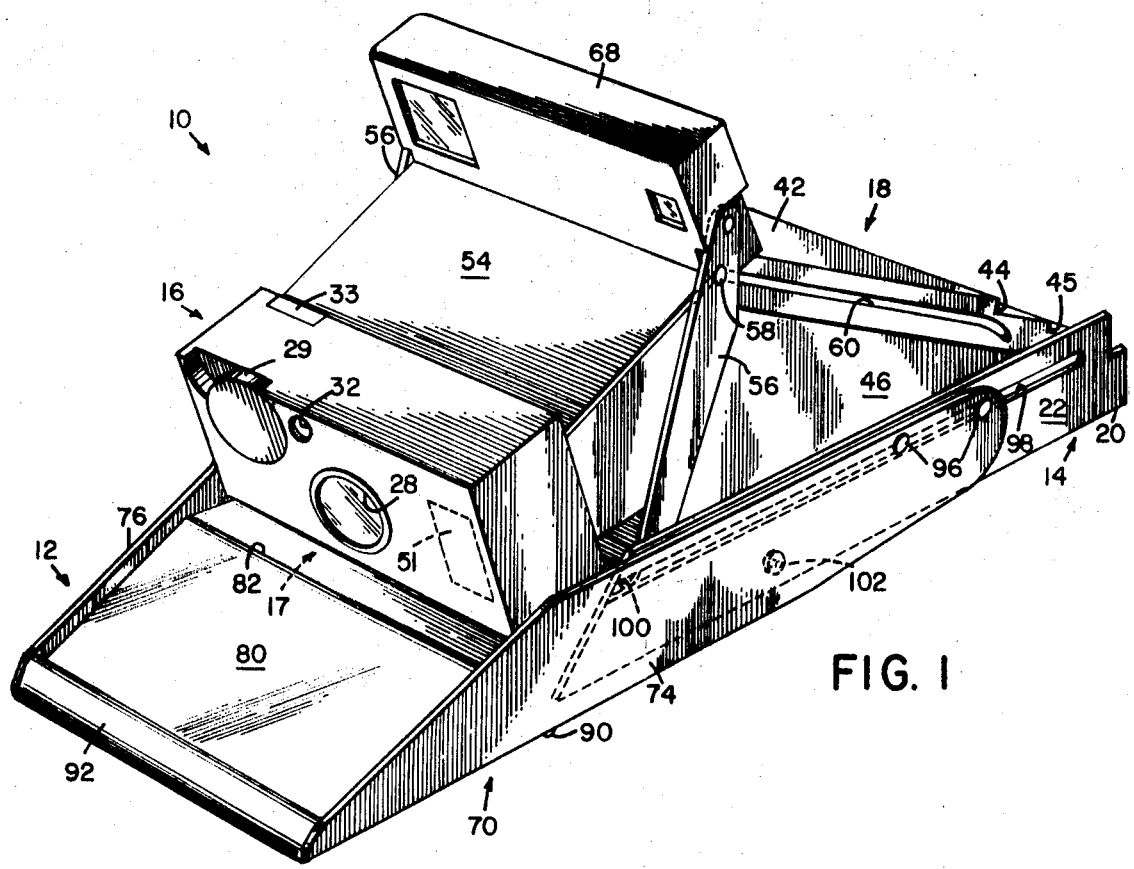

INVENTOR.
JAMES M. WHALL
BY Brown and Mikulka
and
Alfred E. Corrigan
Attorneys

DETACHABLE FILM CHAMBER FOR PHOTOGRAPHIC APPARATUS

This application is a continuation-in-part of my copending application Ser. No. 803,629, filed Mar. 3, 1969, now abandoned.

BACKGROUND OF THE INVENTION

1. Field of the Invention

This invention relates to photographic apparatus, e.g., cameras, of the type adapted to expose, process and store individual film units and, more particularly, to detachably mounted enclosures which are adapted to be moved from a compact position to an extended position in which they function to receive and store film units subsequent to exposure, thereby obviating the necessity of the user handling the film unit, and means for preventing the movement of an exposed film unit from the camera until the enclosure is in position to receive it. The enclosures may be light tight in order to provide a light-free environment for the exposed film unit should it still be susceptible to further exposure to actinic light upon exiting from the camera.

2. Description of the Prior Art

The prior art discloses the general concept of enclosures for receiving and storing film units subsequent to exposure and which are adapted to be moved between compact and extended positions as evidenced by U. S. Pats. Nos. 2,467,320 and 2,873,658. However, no mention is made in the prior art of providing the camera with means for preventing the movement of a film unit toward the exterior of the camera until the enclosure is in position to receive it. Absent this feature, it is possible for the film unit to be propelled from the camera onto the ground where it may be damaged by dirt or water; or, if the film unit is still susceptible to further exposure by actinic light, it will possibly be ruined because of the additional exposure. Finally, if the enclosure is not in position the film unit may be damaged.

SUMMARY OF THE INVENTION

The invention includes an enclosure which is adapted to be detachably connected to a camera of the self-developing type. In a preferred embodiment of the invention, the enclosure is mounted on the camera for reciprocating movement relative thereto. In one extreme of movement, the enclosure is in position to receive an exposed film unit as it exits from the camera. In the other extreme of movement, the enclosure is collapsed against a rear wall of the camera so as to enhance the compactness of the camera. In another embodiment of the invention, the enclosure is adapted to be folded back onto the camera. The enclosures are adapted for use with cameras having electrically powered apparatus for moving the exposed film unit out of the camera. Each enclosure is provided with means for holding a switch to the apparatus in an open position until the enclosure is in the extended or operative position and then allowing the switch to close thereby insuring that the enclosure is in position to receive the exposed film unit prior to the film unit being moved out of the camera.

Accordingly, an object of the invention is to provide, in photographic apparatus of the type wherein a plurality of film units are adapted to be sequentially exposed and processed and means for moving the exposed film units out of the camera and into an enclosure, means for enabling operation of the means for moving only when the enclosure is in position to receive the exposed film unit as it exits from the camera.

Another object of the invention is to provide in photographic apparatus of the type described, an enclosure made of an opaque material for receiving and housing an exposed film unit in a light-free environment until the photosensitive element of the exposed film unit is no longer capable of further exposure by actinic light.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view of a camera having a film receiving chamber or enclosure attached thereto, the enclosure being shown in a partly extended position;

FIG. 2 is a perspective view of the camera of FIG. 1 shown in a collapsed or folded position;

DETAILED DESCRIPTION OF THE INVENTION

Figure 3:
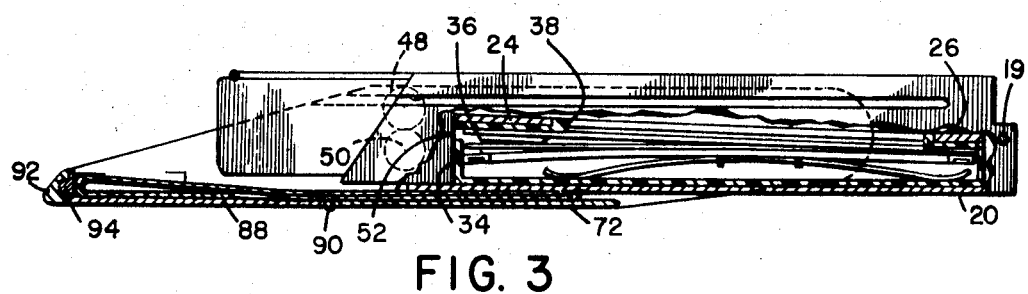
FIG. 3 is an elevational view, partly in section, of the camera of FIG. 1 shown in the folded position and the enclosure shown in a partially retracted position.

Reference is now made to FIGS. 1–3 of the drawings wherein there is shown photographic apparatus including a folding camera 10 of the self-developing type and an enclosure 12 adapted to receive and house a film unit subsequent to exposure. Camera 10 comprises a first or main housing secton 14, a second housing secton 16 incorporating a lens and shutter assembly, and a third housing section 18. First housing section 14, which is pivotally coupled to housing section 18 by hinge 19, is in the form of a relatively thin parallelepipedon and includes a rear wall 20 which functions as a loading door for gaining access to the interior of the camera, side walls 22, and an inner wall 24 formed with an exposure aperture 26 for locating a film pack or assembly of film units in position for exposure.

Second housing 16 is also generally parallelepiped in shape, having a thickness dimension (measured along the optic axis) slightly less than the thickness of main housing section 14, and is pivotally mounted on the main housing section 14 between side walls 22 for pivotal movement between a folded position as shown in FIG. 2 in which the second housing section 16 is engaged between side walls 22 and an erect or operative position as shown in FIG. 1 in which the second housing section 16 is pivoted from the folded position through an angle of less than 90°, e.g., approximately 70° to 75°with respect to the main section 14. Housing sections 14 and 16 cooperate to define an opening 17 through which a film unit is adapted to be advanced subsequent to exposure.

The camera is provided with an exposure system including an adjustable focus objective lens 28, a focusing control 29, and a conventional photographic shutter, preferably of the automatic photoresponsive type, enclosed within the second housing section 16. A window 32 (see FIG. 1) is provided in the forward wall (when erect) of the second housing section 16 for admitting light to a photocell for controlling the operation of the shutter; and a shutter-release button 33 is provided in that wall of the second housing section 16 which is uppermost in the erect position and constitutes an end wall of the camera when folded.

The camera is adapted to be employed with an assemblage of selfadeveloping film units of the type shown and described in U.S. Pat. No. 3,415,644, granted to Edwin H. Land on Dec. 10, 1968, and comprising a container 34 having a forward wall 36 with an exposure aperture 38 for positioning the plurality of film units with the forwardmost film unit supported against forward wall 36, and the photosensitive element thereof positioned for exposure by light transmitted through lens 28. The inner wall 24 provides a means for locating a photosensitive element in position for exposure and, accordingly, is located substantially in a plane, at or near the focal surface of lens 28, disposed at an acute angle with respect to the optic axis of the lens. A mirror is mounted on the inside of third housing section 18 in position, in the erect position of the camera, to redirect light from lens 28 toward a photosensitive element located for exposure behind exposure aperture 26 in inner wall 24. The reflecting surface of the mirror is preferably located at an angle other than 45° with respect to the optic axis of the lens and at an acute angle with respect to the plane of the inner wall when the camera housing sections are in erect position.

Third housing section 18 is connected at 19 to one end of first housing section 14 for pivotal movement with respect to the first housing section between the erect position shown in FIG. 1 and a folded position in which the third housing section is engaged between side walls 22. The third housing section 18 includes an outer wall 42 including a planar portion having an outer surface disposed substantially in the same plane as the forward edges of side walls 22 when the camera is folded, so as to define a secton of the forward wall of the folded camera and recessed sections 44 and 45, located near the end at which the housing sections 18 is pivotally connected to the main housing section 14 and cooperating with side walls 22 to provide, in the folded position of the camera, external recesses for receiving a rangefinder-viewfinder which will be described more fully hereinafter.

The three camera housing sections are adapted, in the erect position, to provide three sides of a lighttight chamber for transmitting light from lens 28 via the aforementioned mirror to a photosensitive element positioned for exposure behind inner wall 24. The remaining sides of this lighttight chamber are defined by an extensible bellows 46, preferably formed of a light-opaque, flexible or elastomeric material, having three openings at which the bellows is secured to inner wall 24 around exposure aperture 26, to wall 42 of third housing secton 18 around the mirror, and to the inner wall of second housing section 16 around lens 28. For more details of the construction of the bellows, reference may be had to U.S. Pat. No. 3,589,253 issued to Irving Erlichman on June 29, 1971, and assigned to the same assignee as the instant application.

An erecting system including a wall 54 and a pair of links 56 is provided for supporting the three housing sections, including the lens, mirror, and photosensitive element in an operative or erect position while readily permitting the housing sections to be folded into an especially compact form. Wall 54 is pivotally connected near one edge to the end of third housing section 18 opposite the end at which the third housing section is pivotally connected the first housing section 14 and at a position 55 on the second housing section 16 remote from the location at which the second housing section 16 is pivotally mounted on the first housing section 14. Wall 54 functions to protect a section of bellows 46 and, in the folded or collapsed position of the camera, provides a section of the outer forward wall of the camera. Each link 56 is pivotally mounted on first housing section 14 adjacent the sides thereof between side walls 22 and closely adjacent the axis at which the second housing section 16 is pivotally connected to the first housing section 14. Each link 56 includes an inwardly projecting stud or pin 58 located intermediate its ends, more proximate to the end furthest from the main housing section. The third housing section 18 is provided on its sides with channels or grooves 60, and studs 58 are engaged for sliding movement in channels 60, between an erect position in which the studs are engaged closely adjacent the pivotal connection between housing section 18 and wall 54 in conforming end sections of the channels, and a folded position in which the studs 58 are located more proximate the opposite end of the third housing section 18. Detent springs (not shown) are provided on the third housing section 18 for engaging and releasably retaining the studs 58 at the ends of channels 60 in the erect position of the camera. A conventional rangefinder-viewfinder 68 is pivotally attached to the ends of links 56 for movement between the operative position shown in FIG. 1 and an inoperative position wherein it is nested within recesses 44 and 45 as shown in FIG. 2. For a more detailed description of the camera, reference may be made to the copending application of Irving Erlichman, Ser. No. 763,883, filed Sept. 30, 1968, now abandoned and replaced by a copending application Ser. No. 809,143, filed Mar. 21, 1969.

The camera is preferably of the self-developing type and includes means for advancing and processing each photographic film unit following exposure thereof, preferably to produce a positive transfer print in the film unit. The means for advancing and processing the film unit include a pair of pressure-applying rolls 48 and 50 mounted in juxtaposition within the main housing section 14, roll 48, in the form shown, being mounted for rotation about the pivotal axis of second housing section 16. The camera includes suitable means, such as a spring wound or battery operated motor 51, mounted in second housing 16, and transmission (not shown) for driving the rolls and the means for advancing each film unit, following exposure thereof, from container 34 through an opening 52 in an end wall of the container into the nip of rolls 48 and 50. Rolls 48 and 50 are rotated to advance the film unit directly from the camera while simultaneously applying compressive pressure to the film unit to distribute a processing liquid therein, thereby initiating a diffusion-transfer process which ultimately results in a viewable image as described in the aforementioned patent to Edwin H. Land.

Figure 4:
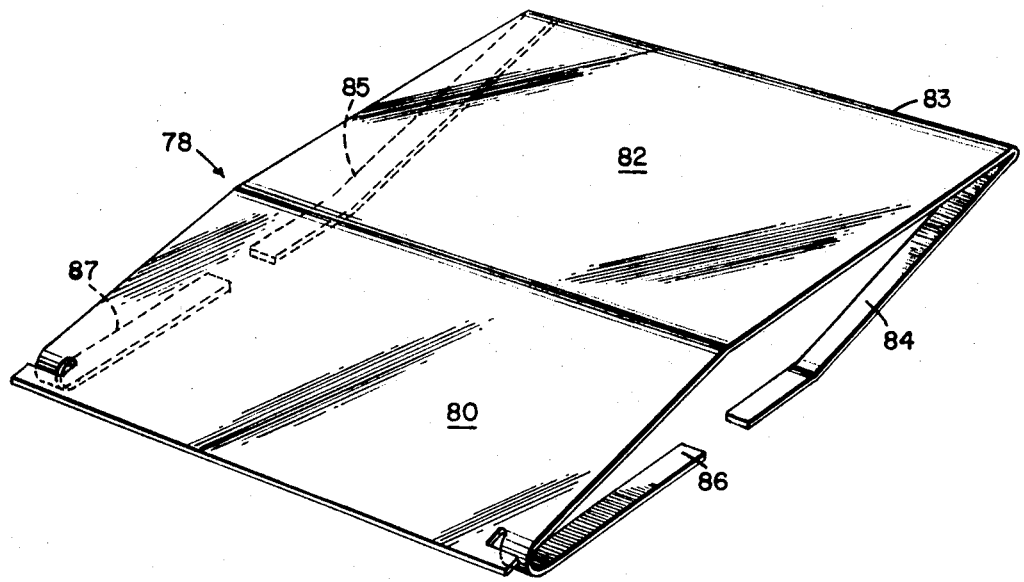
FIG. 4 is a perspective view of a resilient member which forms part of the enclosure for receiving a film unit subsequent to exposure.

Camera 10 is provided with a detachably mounted enclosure 12, as previously mentioned. Enclosure 12 includes a generally U-shaped member 70 having a central portion 72 and upstanding flange sections 74 and 76. Mounted between each flange section 74 and 76 is a resilient shield 78 (see FIG. 4) including sections 80 and 82 having integral legs 84–87, the lower portions of which are attached to the extreme lateral sides of central portion 72. Central portion 72 includes a door 88, pivotable about a hinge 90 for gaining access to the interior of the enclosure 12. Door 88 has a width less than that of portion 72 because of the attachment of the legs 84–87 to the lateral sides of portion 72. A friction latch including an integral section 92 of door 88 and a section 94 attached to section 80 is provided for maintaining door 88 in a closed condition. The facing surfaces of flange sections 74 and 76 are each provided with a plurality of inwardly projecting pins 96 which are adapted to ride in channels 98 (only one of which is shown) located in side walls 22 of first housing section 14. The open forward end of each channel is provided with suitable means, e.g., spring biased retainers 100 for maintaining the enclosure 12 in operative relation with the camera. Should it become necessary to detach the enclosure from the camera the user merely pulls the enclosure along a line parallel with channels 98 with a force sufficient to enable pins 96 to pass the retainers 100. Alternatively, enclosure 12 could be molded in a manner which would give each flanges 74 and 76 an inwardly bias, i.e., towards each other, when they are held normal to central portion 72, and an integral rib molded into each facing surface of flanges 74 and 76 would ride in each groove 98.

In operation, the various sections of the camera are moved from the compact position shown in FIG. 2 to the extended position shown in FIG. 1 by grasping the rangefinder-viewfinder 68 and moving it in a generally counterclockwise manner. The enclosure 12 is allowed to remain in the position shown in FIG. 2 so as not to obstruct the field of view of lens 28. After shutter release 33 is actuated to expose the forwardmost film unit located within film container 34, the enclosure 12 is moved to the fully extended position, i.e., slightly more than that shown in FIG. 1. Movement of enclosure 12 to the fully extended position results in flange 74 moving out of engagement with a normally closed switch 102 which is in the circuit between the motor 51 and the mechanism including rolls 48 and 50 previously described. When flange 74 uncovers switch 102 the switch closes and the exposed film unit is moved from the film container, through the rolls, and into the enclosure 12. Should the film unit no longer be subject to further exposure by actinic radiation, it may then be removed from the enclosure via door 88. It will be noted that switch 102 prevents movement of the exposed film unit until enclosure 12 is in position to receive it thereby doing away with the necessity of the user having to immediately handle the exposed film unit. Should the film unit still be subject to further exposure upon leaving the camera suitable means may be provided between U-shaped member 70 and shield 78 to provide a lighttight environment in which the exposed film unit can remain until it is no longer subject to further exposure. Of course, in the latter case shield 78 would be opaque whereas in the former case it could be transparent to allow inspection of the exposed film unit without removing it from the enclosure.

To move the enclosure 12 toward the non-extended position as shown in FIG. 3, section 82 of shield 78 is pressed downwardly until its edge 83 clears the rolls 48 and 50 and the bottom wall 20 of the camera. The enclosure is then moved to the right until it occupies the position shown in FIG. 2.

An alternative embodiment of the invention is shown in FIGS. 5–8 of the drawings. In this embodiment a camera 110 of the same type as that described in FIGS. 1–4 is provided with an enclosure 112. Enclosure 112 includes a flexible sleeve 114 which is adapted to receive a film unit as it exits from the camera. Sleeve 114 includes an open end 116 and a closed end 118. Molded within sleeve 114 near end 116 is a mounting member in the form of a resilient wire 120 which is bent into two generally U-shaped members 122 having bowed legs connected to each other at looped portions 124, and a second wire 126 secured to wire 120. Portions 124 are adapted to receive any suitable means, e.g., pins 125 which extend from a housing section of the camera for attaching the sleeve to the camera in a lighttight manner. Sections 128 and 130 of wire 120 are mounted within grooves 132 and 134 located within housing sections 136 and 138, respectively, to maintain sleeve 114 in a surrounding and lighttight relation with opening 17 (see FIG. 3) in both the folded and extended positions of the housing sections and the enclosure. Normally closed end 118 includes portions 140, 142 which overlap each other to prevent the admission of light therethrough. A spring 144 in the form of an elongated closed loop is molded or otherwise suitably attached within sleeve 114 near end 118 for urging portions 140 and 142 into an overlapping position and is constructed to open end 118 upon the application of force to points 146 and 148 to allow removal of the film unit from the sleeve. Sleeve 114 is also provided with pleats 150 along each lateral side thereof to facilitate folding of the sleeve into the collapsed position as will be described shortly. Alternatively, the pleats 150 could originally be molded in an elastomer forming the sleeve and the pleats would disappear when the envelope was in the stressed or extended position and would have a memory which would cause the plates to fold inwardly when the sleeve was moved to the folded position.

Figure 5:
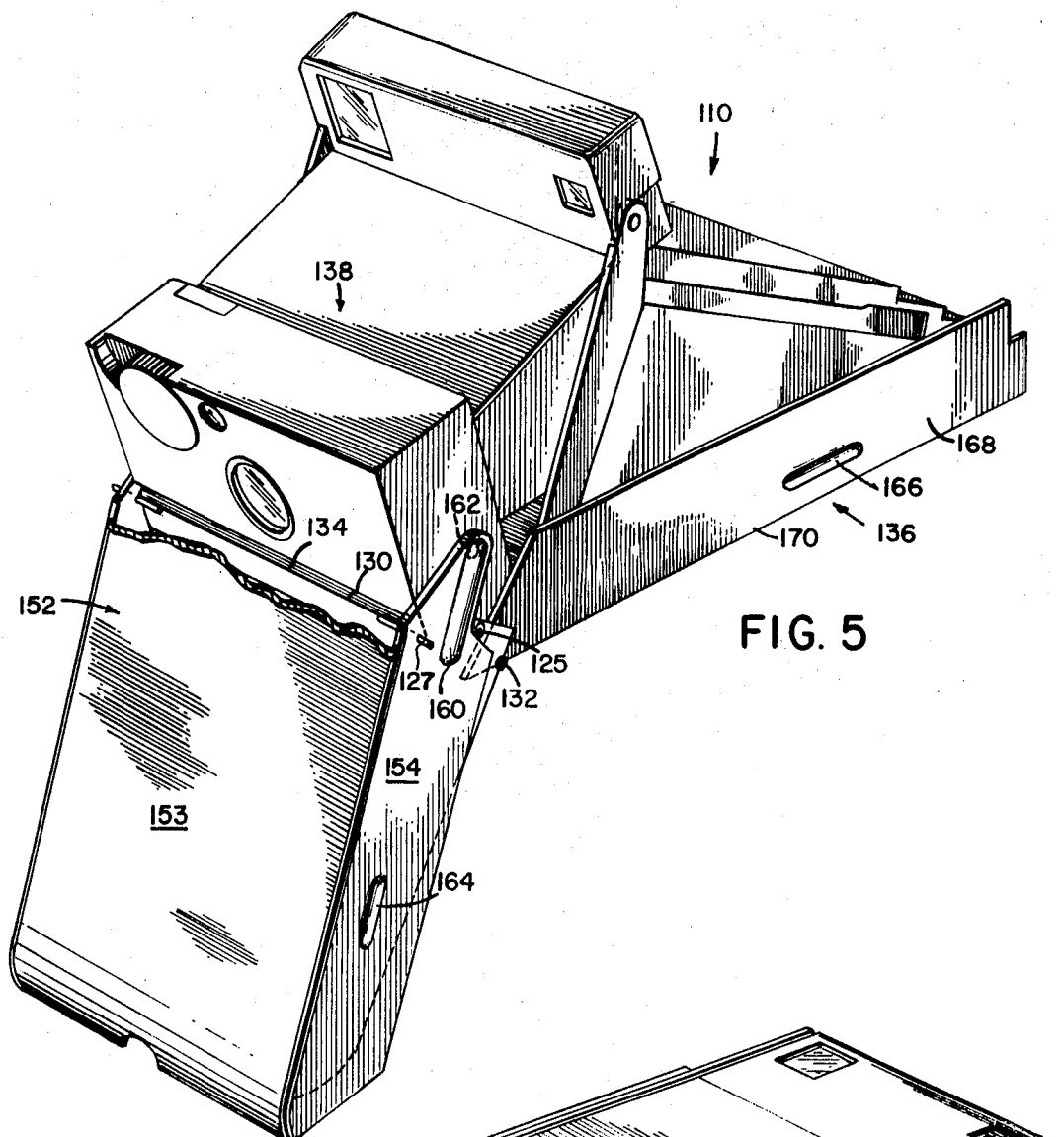
FIG. 5 is a perspective view of an extensible type camera having a modified enclosure thereon for receiving film units subsequent to exposure, the camera and enclosure being shown in an extended, operative position.
Figure 6:
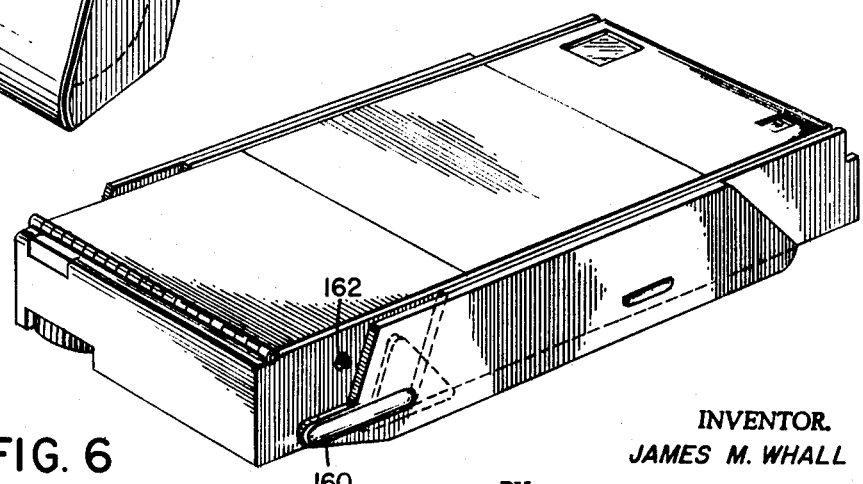
FIG. 6 is a perspective view of the camera of FIG. 5 shown in a compact, folded position.
Figure 7:
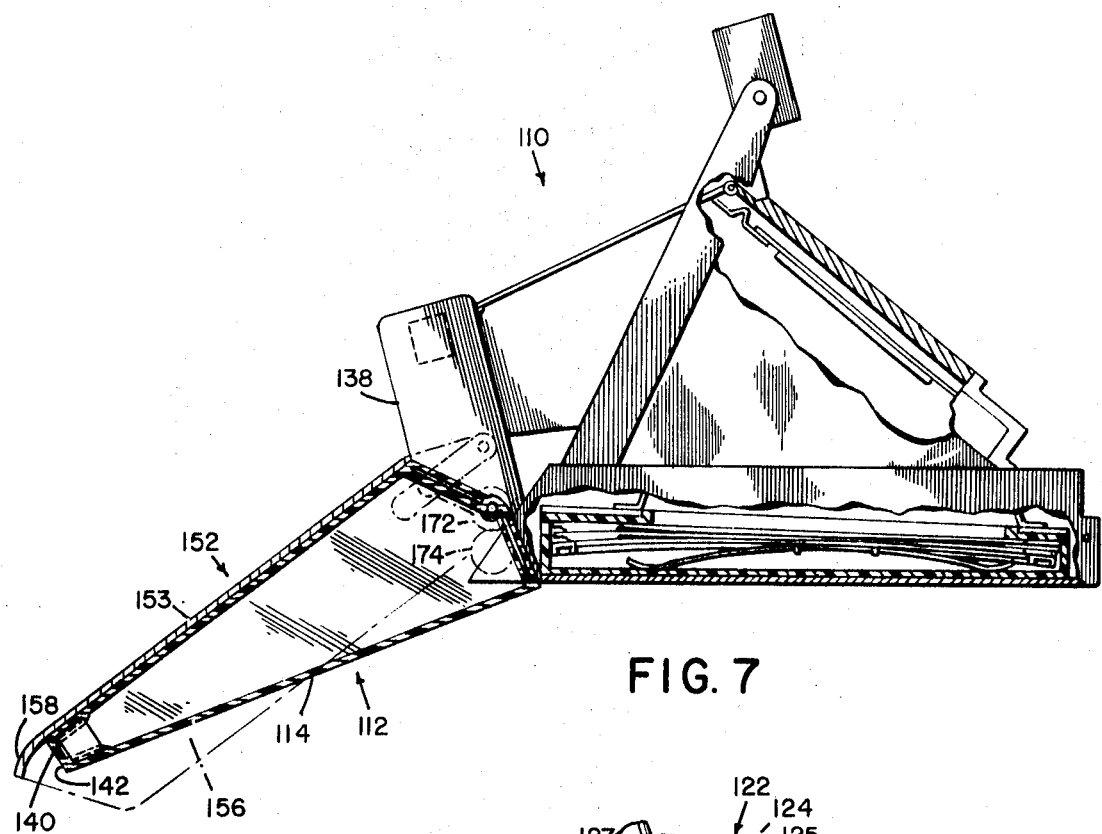
FIG. 7 is an elevational view, partly in section, of the camera and enclosure shown in FIG. 5.
Figure 8:
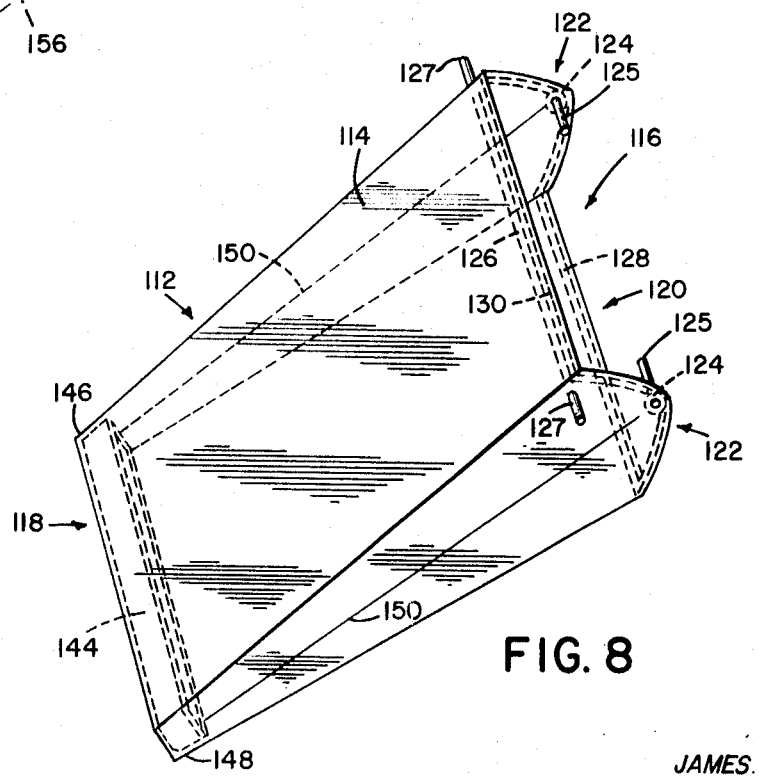
FIG. 8 is a perspective view of the enclosure shown in FIGS. 5–7.

A cover 152, constructed from metal or a high impact plastic, is secured to sleeve 114 by any suitable means, e.g., glue, to support sleeve 114 in the extended position shown in FIGS. 5 and 7 and to protect sleeve 114 in the collapsed or folded position. Cover 152 includes a main secton 153 which is substantially coextensive with sleeve 114 and a pair of longitudinally extending flanges 154, 156 extending from end to end thereof. Flanges 154 and 156 cooperate with main section 153, which includes a curved end section 158, to substantially enclose sleeve 114 in the folded or collapsed position of the enclosure. Flange 154 includes at one end thereof, a recessed portion adapted to receive a projection on second housing 138 for maintaining the cover 152 and sleeve 114 in an extended position. As shown in FIGS. 5 and 6 the flange 154 is provided with a recessed portion 160 which in the extended position shown in FIG. 5 is adapted to contact and close a normally open switch 162 in the circuit between the camera's motor and the rolls 172 and 174 and the means for advancing an exposed film unit from its container. Alternatively in the case of a spring wound motor, switch 162 could be used to engage a clutch in the transmission between the motor and the advancing means including the rolls. Switch 162 not only aids in supporting cover 152 and sleeve 114 in the extended position but also insures that the rolls will not advance a film unit into sleeve 114 until the latter is in the operative position, i.e., the position shown in FIG. 5, thereby obviating any possibility of the film unit being jammed by the misalignment between the exit opening and sleeve 114. A rib 164 on each of flanges 154, 156 is adapted to cooperate with a recess 166 in each wall 168 of the main housing section to maintain cover 152 and a portion of sleeve 114 in a folded or collapsed position against the camera's rear wall 70. To enable this movement between extended and folded positions, cover 152 is pivoted about the ends 127 of wire 126 which is located immediately in front of housing 138. To remove the enclosure from the camera the user merely spreads the U-shaped members 122 out of engagement with the pins 125.

In the operation of the camera, the rangefinder-viewfinder is grasped and rotated in a counterclockwise direction to move the housing sections to the extended position shown in FIGS. 5 and 7. Cover 152 and the major portion of sleeve 114 are then moved in a clockwise manner about pins 127 and to the extended position shown in FIGS. 5 and 7, wherein the sleeve 114 and cover 152 form an extension of housing sections 136 and 138 and switch 162 is moved to the closed position. Sleeve 114 is now in a position to receive an exposed film unit in a light-free environment. The camera's shutter is then actuated to expose the forwardmost film unit and connect the camera's motor with a source of power to drive rolls 172 and 174 and the means (not shown) for advancing the film unit from its container into the bite of the rolls and then into sleeve 114 while still sensitive to light. After a predetermined period of time, which is sufficient for the processing of the film unit to reach a stage where it is no longer light-sensitive, pressure is applied to the ends 146, 148 of spring 144 to open end 118 thereby allowing withdrawal of the film unit.

Although the enclosures described herein have been shown attached to a folding type camera it is to be understood that they may equally well be attached to non-collapsible type cameras.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A camera comprising, in combination:
   a housing for supporting a film unit in position for exposure;
   means defining an exit opening for allowing passage of a film unit therethrough to the exterior of said camera;
   advancing means within said camera for moving a film unit through said exit opening to a position exterior of said camera;
   an enclosure defining a chamber dimensioned to receive a film unit, said enclosure being mounted on said housing and having an open end adapted to cooperate with said exit opening to allow movement of a film unit therethrough into said enclosure;
   mounting means for mounting said enclosure on said housing for movement between a first position in which said enclosure forms an extension of said housing and is in position to receive a film unit as it exits from said opening into said enclosure and a second position in which at least a portion of said enclosure is located against a wall of said housing;
a source of power for driving said advancing means;
switch means for coupling and uncoupling said advancing means and said source of power; and
means responsive to the position of said enclosure relative to said housing for operating said switch means to couple said advancing means and said source of power when said enclosure is located in said first position thereby enabling said advancing means to advance a film unit into said chamber, and uncoupling said advancing means and said source of power when said enclosure is located in a position other than said first position to disenable said advancing means thereby preventing a film unit from being advanced from said camera when said enclosure is not positioned to receive it.

2. A camera as defined in claim 1 wherein said enclosure is mounted on said housing for reciprocating movement.

3. A camera as defined in claim 2 wherein a portion of said enclosure is mounted for movement below said advancing means prior to entering said second position.

4. A camera as defined in claim 2 wherein said enclosure includes a first member coupled by said mounting means to said housing for movement between said first and second positions; and
a second member coupled to said first member for movement relative thereto between an extended position when said first member is located in said first position for cooperating with said first member to define said chamber and a collapsed position when said first member is located in said second position such that said second member is located between said first member and said wall of said housing.

5. A camera as defined in claim 4 wherein said second member includes integrally formed resilient legs coupled to said first member for biasing said second member toward said extended position.

6. A camera comprising, in combination:
a housing for supporting a film unit in position for exposure;
means defining an exit opening for allowing passage of a film unit therethrough to the exterior of said camera;
advancing means within said camera for moving a film unit through said exit opening to a position exterior of said camera;
an enclosure defining a chamber dimensioned to receive a film unit, said enclosure being mounted on said housing and having an open end adapted to cooperate with said exit opening to allow movement of a film unit therethrough into said enclosure;
mounting means for mounting said enclosure on said housing for movement between a first position in which said enclosure forms an extension of said housing and is in position to receive a film unit as it exits from said opening into said enclosure and a second position in which at least a portion of said enclosure is located against a wall of said housing;
a source of power for driving said advancing means;
switch means for coupling and uncoupling said advancing means and said source of power; and
rigid cover means including switch actuating means coupled with said enclosure for supporting said enclosure and for closing said switch means to allow operation of said advancing means when said enclosure is in said first position and for disconnecting said advancing means from said source of power when said enclosure is not in said first position.

7. A camera as defined in claim 6 further including means mounting said cover means to said enclosure for movement of said portion of said enclosure and said cover means to a position wherein said cover means substantially encompasses said enclosure in said second position.

8. A camera as defined in claim 7 wherein said enclosure includes pleated sides to facilitate folding thereof.

9. A camera as defined in claim 7 wherein said cover means includes locking means cooperable with said housing for maintaining said enclosure in either said first position or said second position.

10. A camera as defined in claim 1 wherein said enclosure is lighttight in said first position.

11. A camera as defined in claim 1 wherein at least a portion of said enclosure is transparent.

12. An enclosure for use with a camera of the self-developing type, said enclosure comprising:
a first member including means for removably coupling said first member to a camera for reciprocating movement between a compact position and an extended position; and
a second member resiliently coupled to said first member for movement relative thereto between an extended position when said first member is located in said extended position wherein said first and second members cooperate to define a chamber for receiving a film unit and a collapsed position when said first member is located in said compact position wherein said enclosure is located out of the field of view of the camera's lens.

13. An enclosure as defined in claim 12 wherein said second member is transparent.

14. An enclosure for use with a camera of the self-developing type for housing a film unit in a light-free environment during development thereof comprising:
a light-impervious sleeve including two flexible sections joined to each other at their lateral sides to form an elongated chamber having a normally open end and portions of said sections cooperating to form a lighttight, normally closed end;
mounting means for attaching said enclosure to said camera in a lighttight manner and for maintaining said normally open end in an open position for allowing passage of a film unit from said camera through said normally open end and into said sleeve; and
spring means mounted near said normally closed end for maintaining said normally closed end in a closed position to prevent the passage of light therethrough, said spring means being constructed and arranged to separate said portions of said sections to open said normally closed end for allowing the withdrawal of a film unit from said sleeve through said normally closed end.

15. An enclosure as defined in claim 14 wherein said sleeve includes pleated sides.

16. An enclosure as defined in claim 14 wherein said mounting means attaches said enclosure to said camera for movement of at least a portion of said enclosure between an operative extended position and a compact collapsed position.

17. An enclosure as defined in claim 10 further including cover means cooperating with said camera to substantially encompass said enclosure in said compact collapsed position.

* * * * *